(12) United States Patent
Faber et al.

(10) Patent No.: US 8,343,249 B2
(45) Date of Patent: Jan. 1, 2013

(54) FILTER ELEMENT, PARTICLE FILTER, METHOD FOR MARKING A FILTER ELEMENT, METHOD FOR PRODUCING A PARTICLE FILTER AND USE OF A FILTER ELEMENT

(75) Inventors: Michael Faber, Neustadt (DE); Daniel Eckhardt, Neustadt (DE)

(73) Assignee: Saint-Gobain Industriekeramik Roedental GmbH, Roedental (DE)

( * ) Notice: Subject to any disclaimer, the term of this patent is extended or adjusted under 35 U.S.C. 154(b) by 0 days.

(21) Appl. No.: 13/381,499

(22) PCT Filed: Jul. 19, 2010

(86) PCT No.: PCT/EP2010/060424
§ 371 (c)(1),
(2), (4) Date: Dec. 29, 2011

(87) PCT Pub. No.: WO2011/020666
PCT Pub. Date: Feb. 24, 2011

(65) Prior Publication Data
US 2012/0132076 A1    May 31, 2012

(30) Foreign Application Priority Data
Aug. 19, 2009  (DE) .......................... 10 2009 038 049

(51) Int. Cl.
*B01D 46/00* (2006.01)
(52) U.S. Cl. ................ 55/484; 55/483; 55/523; 55/524; 55/DIG. 30; 428/116
(58) Field of Classification Search ............... 55/483, 55/484, 523, 524, DIG. 30; 428/116
See application file for complete search history.

(56) References Cited

U.S. PATENT DOCUMENTS

| | | | | |
|---|---|---|---|---|
| 7,214,253 | B2 * | 5/2007 | Bardon et al. .................. | 55/523 |
| 7,445,656 | B2 * | 11/2008 | Bardon et al. .................. | 55/523 |
| 7,455,710 | B2 * | 11/2008 | Masukawa et al. ............. | 55/523 |
| 7,547,343 | B2 * | 6/2009 | Bardon et al. .................. | 55/523 |
| 7,754,309 | B2 * | 7/2010 | Fujita et al. .................... | 428/116 |
| 2005/0102984 | A1 | 5/2005 | Bardon et al. | |
| 2006/0191244 | A1 | 8/2006 | Bardon et al. | |
| 2007/0059483 | A1 * | 3/2007 | Fujita et al. .................... | 428/116 |
| 2009/0288380 | A1 * | 11/2009 | Gleize et al. .................... | 55/483 |

FOREIGN PATENT DOCUMENTS
DE     10 2007 029 417     1/2009

OTHER PUBLICATIONS

PCT Search Report of International Application PCT/EP2010/060424 filed on Jul. 19, 2010 in the name of Saint-Gobain Indstriekeramik Rodental GMBH.
PCT Written Opinion of International Application PCT/EP2010/060424 filed on Jul. 19, 2010 in the name of Saint-Gobain Indstriekeramik Rodental Gmbh (German and English).

* cited by examiner

*Primary Examiner* — Robert Clemente
(74) *Attorney, Agent, or Firm* — Steinfl & Bruno, LLP

(57) ABSTRACT

A filter element, a particle filter, a method for marking a filter element, a method for producing a particle filter and the use of a filter element are described. With such methods and filter elements, individual filter elements can be securely adhered in a simple manner to form a filter. An identification means is applied to the end surfaces of each filter element for producing a particle filter, thus enabling the defined orientation of the filter elements for the adhesive process and preventing erroneous adhesion.

19 Claims, 3 Drawing Sheets

Figure 1:
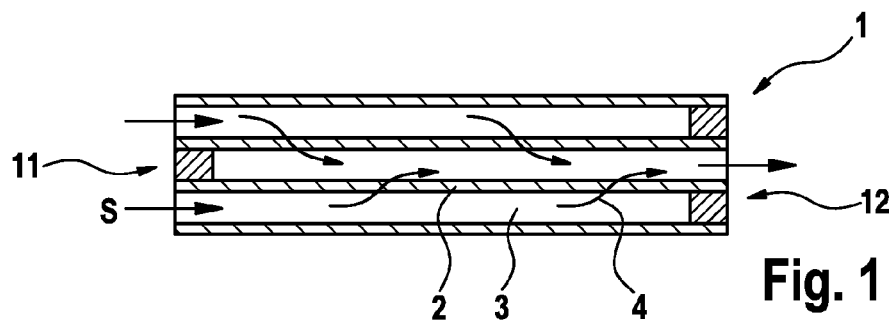

FILTER ELEMENT, PARTICLE FILTER, METHOD FOR MARKING A FILTER ELEMENT, METHOD FOR PRODUCING A PARTICLE FILTER AND USE OF A FILTER ELEMENT

CROSS REFERENCE TO RELATED APPLICATIONS

The present application is the US national stage of International Application PCT/EP2010/060424 filed on Jul. 19, 2010, which, in turn, claims priority to German Patent Application DE 10 2009 038 049.3 filed on Aug. 19, 2009.

The invention relates to a filter element, a particle filter, a method for marking a filter element, a method for producing a particle filter, and the use of a filter element. The filter element is configured as a multisurface volume element that comprises, for the production of a particle filter, in particular of a diesel particle filter, at least one surface provided as an adhesion surface for bonding with another filter element. The filter element comprises end surfaces that are configured as an intake side and an exhaust side. The filter element can be flowed through by a fluid through the intake side and the exhaust side.

Filter elements of this type are known, for example, from US patent 2006/0191244 A1. A plurality of filter elements or filter blocks are adhered together there to form a filtration structure for exhaust gases. There, the filter elements are coated such that at the time of adhesion regions with adhesion and regions with only slight or no adhesion are formed between the adhesive surfaces of the individual elements. Thus, artificial weak points are created between the individual filter elements such that tensions in the filter can be dissipated.

The elasticity and robustness of the filter thus produced is, however, only provided suitably if the arrangement of the weak points and the adhered regions is present in a defined manner. In other words, to generate the weak points, the coated filter elements must be adhered to each other in a defined orientation such that the coating structures of the individual elements structures come together in a defined manner.

Problematic here is the correct arrangement of the filter elements for the production of the filter. Often, the orientation of the individual elements is confused and the elements are incorrectly adhered to each other.

The object of the invention is to provide filter elements with which a risk of confusion with regard to their orientation is avoided and the production of particle filters is simplified. In addition, it is an object of the invention to provide a particle filter with proper adhesion. Corresponding methods, with which the production of particle filters is facilitated or simplified should also be provided.

This object is accomplished by a filter element according to claim 1, a particle filter according to claim 7, corresponding methods according to claims 9 and 10, and through the use of a filter element according to claim 15.

In particular, the object is accomplished by a filter element that is provided for the production of a particle filter, in particular of a diesel particle filter, and that is marked or labeled such that a correct adhesion of a plurality of elements to each other by means of an adhesive or an adhesive layer is guaranteed.

For this, the element is configured as a multisurface volume element, wherein end surfaces are provided as an intake side and an exhaust side for a medium flowing through the filter element. The filter element has at least one adhesion surface, with which the element can be connected to another filter element by means of an adhesive or an adhesive layer. For protection against penetration of unwanted materials, the intake side and the exhaust side, i.e., the end surfaces, are covered with, in each case, at least one protective element. This covering can be removed after production of the particle filter.

The at least one adhesion surface is configured with at least one region with a layer made of adhesive-repellent material and at least one uncoated region configured complementary thereto. The adhesive-repellent layer can be configured such that it actually completely repels the adhesive (for the adhesion of the other filter element) or that only a weak or slight adhesion is provided between corresponding surface regions of the various filter elements. When two filter elements are correctly adhered to each other, the adhesive adheres only slightly or not at all to the layers with the adhesive-repellent material such that gaps are intentionally formed between the elements. A finished particle filter thus has, together with sufficient mechanical strength, high flexibility or elasticity.

An identification means (marking, label) is applied on the protective element of the intake side of the filter element and/or the exhaust side of the filter element, preferably with an orientation, such that the identification means reflects an orientation of the at least one region with the layer made of adhesive-repellent material such that the filter element can be adhered to the other filter element to produce the particle filter according to the predefined identification means. For this, the individual adhesion surfaces are configured to accommodate an adhesive layer of the adhesive. The intake and exhaust side can be differentiated by the identification means, and the orientation of the regions with the adhesive-repellent layer can be detected from the respective end surface of each filter element. The regions can be applied as a pattern with the identification means giving information via the pattern.

Here, the term "orientation" or "alignment" of the region or of the regions of the adhesive-repellent layer on each adhesion surface means, for example, the arrangement of the regions or the distribution of the regions on the adhesion surface. It can also be used to identify a defined pattern of the adhesive-repellent layer.

The marking thus permits the correct alignment of the filter element according, for one thing, to the intake side or the exhaust side and according, for another thing, to the structuring of the pattern. Thus, the filter elements can be arranged in the manner desired and can thus be adhered to each other, i.e., processed, in correct alignment. The correct alignment of the filter elements relative to their coating ensures the defined placement of regions with an adhesive-repellent layer. Thus, adhesion points and gaps can be formed between two filter elements.

Since the end surfaces of each filter element are provided as the intake side or the exhaust side for a medium flowing through the element, a direction of flow of the filter element runs substantially parallel to the adhesion surface or to the adhesion surfaces. Preferably, each filter element is configured as a polygonal element (e.g., rectangular, hexagonal, octagonal, etc., depending on use) and can thus have a plurality of adhesion surfaces, on which, in each case, another filter element can be joined. Thus, for example, a rectangular element can have four adhesion surfaces.

The filter elements are configured, for example, from a monolithic structure, e.g., from silicon carbide (SiC).

The protective element is preferably configured from paper, cardboard, or the like. Materials of this type are cost-effective and can be readily removed after the production process.

Preferably, at least two spacer elements that are applied on the at least one adhesion surface of the filter element, preferably, in each case, on its two ends, are provided. The spacer elements guarantee sufficient thickness of the adhesive layer between individual filter elements to be adhered such that the joint layer ensures a sufficient hold. In each case, two spacer elements are preferably applied in each case on each end of the adhesion surface or on the ends of every second adhesion surface, such that a surface with spacers is opposite a surface without spacers. Otherwise, the risk would exist that two spacers would come together and double the minimum cement thickness. Thus, the adhesive thickness of the adhesive layer can be configured substantially uniformly. The spacer elements are configured, for example, as plastic discs.

As already described above, the at least one adhesion surface is configured with a layer made of adhesive-repellent material, i.e., regions (at least one region) of the adhesion surface are covered with this layer. The layer is preferably applied as a pattern such that in a finished particle filter, there is a uniform distribution of gaps between the filter elements. Preferably, the pattern is configured as a checkerboard. If multiple surfaces, e.g., all surfaces of the polygonal element, for example, the four surfaces of the rectangular element, are provided as adhesion surfaces, each adhesion surface can have at least two regions with the layer made of adhesive-repellent material, such that a pattern of adhesion surface to adhesion surface is configured as a checkerboard. The individual regions of the layers made of adhesive-repellent material are thus applied alternatingly such that the patterns of adhesion surface to adhesion surface alternate in checkerboard form. Obviously, it is also possible to provide a checkerboard pattern already on one of the adhesion surfaces.

The patterns can be implemented in any conceivable shape. Care must be taken to ensure that adhesive regions and gap regions alternate such that the finished particle filter has a high degree of elasticity and, simultaneously, high stability.

In a preferred embodiment, the identification means is provided as a line or bar having an orientation that runs parallel in each case to two edges of the respective end surface. In other words, the marking is applied according to the course of the pattern, preferably painted or spread on with color. The orientation or alignment of the identification means gives in this case the reference for the alignment of the regions with the adhesive-repellent layer or for the alignment of the patterns.

Preferably, the adhesive or the adhesive layer is provided as a cement.

The adhesive-repellent layer can be provided as boron nitride (BN), since boron nitride prevents bonding of the cement.

Further claimed is a particle filter configured from at least two, preferably from more filter elements or a plurality of filter elements. The filter elements are configured as described above.

Each adhesion surface of a filter element has regions with an adhesive-repellent layer and complementary uncoated regions. For production of a particle filter-blank, at least two filter elements of the above-described type must be arranged relative to each other, according to the predefined identification means such that the at least one region with the layer made of adhesive-repellent material of the adhesion surface of the one filter element lies opposite the at least one uncoated region of the adhesion surface of the other filter element and reversed. Each filter element includes the marking that indicates how the pattern of the layer(s) made of adhesive-repellent material of the individual adhesion surfaces of each filter element run. Since, preferably, each filter element has the same pattern, they are always labeled with the same marking after orientation of the pattern.

Between the adhesion surfaces of the at least two filter elements, an adhesive layer is provided to adhere the two filter elements, with a gap configured between the adhesive and the region with the layer made of adhesive-repellent material, as described above. With an alternating pattern, gaps between the adhesive layer and the adhesive-repellent layer are configured alternatingly on the individual filter elements. In principle, the filter elements are thus bonded or adhered to each other by bridges in the adhesive layer or in the cement.

In the case of line marking, the filter elements are to be aligned such that the line markings of the adjacent filter elements have different alignments or orientations. When the finished particle filters are viewed on the end surfaces, the line markings (of adjacently arranged filter elements) are oriented alternatingly substantially at right angles to each other. Thus, it is guaranteed that the adjacent adhesion surfaces of different filter elements are not oriented with their patterns or regions with adhesive-repellent material in mirror image relative to each other. Based on the identification, it is guaranteed that the particle filter is adhered correctly and the gaps, in particular in the case of the checkerboard pattern, are arranged offset (the gaps would otherwise be continuous and not configured alternatingly).

In an advantageous embodiment, 4×4 filter elements or multiples of these elements are adhered together to form a particle filter, with the particle filter preferably configured as a wall filter.

Here, the term "wall filter" means a filter with parallel running channels (from end surface to end surface), with the intake channels closed on the opposing end of the intake. Conversely, the exhaust channels are closed on the opposing ends of the exhaust. Since intake channels and exhaust channels are in each case alternatingly adjacent, the fluid to be cleaned is forced through the barrier wall between the channels from an intake channel into the exhaust channel, with the barrier wall acting as a filter retaining the particles to be filtered out (e.g., soot).

After the adhering of the filter elements, particle filter-blanks are available, which ultimately must still be processed into the actual end product. The particle filters themselves are dried and freed of the protective elements to expose the intake channels or exhaust channels.

With the method described in the following, the object of simplifying the production of particle filters is likewise accomplished.

In particular, the object is accomplished by a method for marking a filter element that is configured as a multisurface volume element. The filter element is configured as described above. The following steps are provided to ultimately produce a particle filter with the desired orientation of the individual filter elements.

By means of an image recognition system (e.g., using photographs), the alignment of the filter element is detected, e.g., using the recognition of the intake side and the exhaust side. In other words, the orientation of the filter element is determined. The filter element must then be aligned as necessary such that it can be brought into contact with at least one other element. For this, the adhesion surfaces of the filter elements must meet appropriately.

The intake side and the exhaust side of the filter element are covered with protective elements. The direction of flow of particle filter runs substantially parallel to the adhesion surfaces.

Now, a layer made of adhesive-repellent material is applied to at least one region of the at least one adhesion surface of the filter element such that at least one uncoated region configured complementary thereto is provided.

Finally, an identification means is applied on the protective element of the intake side of the filter element and/or of the exhaust side of the filter element such that the identification means reflects the orientation of the at least one region with the layer made of adhesive-repellent material, such that the filter element can be adhered to another filter element to produce the particle filter according to the predefined identification means.

To ultimately produce the particle filter, the steps just mentioned must be executed for each filter element and for each adhesion surface of each filter element, with the filter elements arranged relative to each other such that they have the same orientation with regard to the intake side and the exhaust side and thus at least two filter elements can be brought into contact with each other.

Thus, at least two filter elements can be joined together into a particle filter-blank according to the predefined identification means such that the at least one region with the layer made of adhesive-repellent material of the adhesion surface of the one filter element lies opposite the at least one uncoated region of the adhesion surface of the other filter element and reversed.

Now, an adhesive layer must be applied between the adhesion surfaces of the at least two filter elements and the at least two filter elements are adhered such that a gap is configured in each case between the adhesive or the adhesive layer and the regions with the layer made of adhesive-repellent material.

Because of the fact that the gaps, due to the pattern arranged offset relative to each other (e.g., checkerboard pattern) of the layers of the opposing adhesion surfaces, also pass through offset between the individual adhesion surfaces of the opposing filter elements, but the adhesive layer extends completely between the adhesion surfaces, the adjacent filter elements are adhered. Only in the region of the gaps, the adhesive produces no bond (or only a weak bond) to the corresponding filter element. The filter elements are thus bonded together via adhesive bridges.

After adhering, the particle filter-blank must be dried and controlled for correct adhering. After that, the protective elements with the markings can be removed from the end surfaces of each of the filter elements. This exposes the filter channels and the filter is ready for use.

The individual filter elements are preferably provided as polygonal elements, e.g., as rectangular elements, and can thus (in the case of the rectangular element) have four adhesive sides. Furthermore, for a particle filter in a preferred embodiment, at least 4×4 or more elements are adhered to each other.

Preferably, the step of the application of at least two spacer elements on the at least one adhesion surface of the filter element or of each filter element, preferably, in each case, on the two ends of the adhesion surface is provided. This ensures that a sufficiently great adhesive thickness is formed between the individual filter elements. To achieve an even layer thickness, in each case, two spacer elements must preferably be applied in each case on each end of an adhesion surface. The spacer elements define a minimum thickness that the adhesive layer is to have. Here, care must be taken that, in any case, an adhesion surface with spacer elements is positioned opposite an adhesion surface without these spacer elements. In principle, it is also possible to provide spacers on each adhesion surface, but in that case with a height that corresponds to one-half the desired layer thickness of the adhesive.

Through the provision of a minimum layer thickness, the adhesion of the filter elements is ensured to a high degree despite the formation of gaps.

Preferably, the region with the layer made of adhesive-repellent material is applied as a pattern, in particular, as a checkerboard pattern. Optionally, layers made of adhesive-repellent material can be applied to multiple, in particular to all surfaces of the polygonal element provided as adhesion surfaces, with each adhesion surface having at least two regions with the layer made of adhesive-repellent material such that a pattern of adhesion surface to adhesion surface of each filter element is configured as a checkerboard. The filter elements thus prepared can then be joined together such that the regions with the adhesive repellent layer are not positioned opposite each other.

Moreover, the step of the application of the identification means can be provided as a line or bar having an orientation. Preferably, the identification means is applied with a color such that the line or bar runs parallel to two edges of the respective end surface. Each filter element is thus marked in the same manner and can be accordingly oriented for processing. The protective elements are, for example, paper strips, on which the markings or identification means can be simply applied.

After adhering and drying, the particle filter can be brought to its final shape by means of trimming and/or grinding, for example, into a round or oval shape. If the filter elements already have an appropriate shape such that the final shape of the filter is already predefined by the adhering of the elements, further processing, such as cutting and/or grinding can, optionally, be omitted. The individual filter elements are thus preferably configured such that they form a particle filter with a desired shape as soon as they are adhered to each other.

The application of the identification means can be carried out manually, i.e., by hand, or, on the contrary, the identification process can be automated. For this, robots or similar automating systems are provided, with which rational processing is enabled.

Finally, the use of a filter element like that described above for the production of a particle filter, in particular a diesel particle filter, is claimed.

Additional embodiments of the invention emerge from the subclaims.

Figure 2:
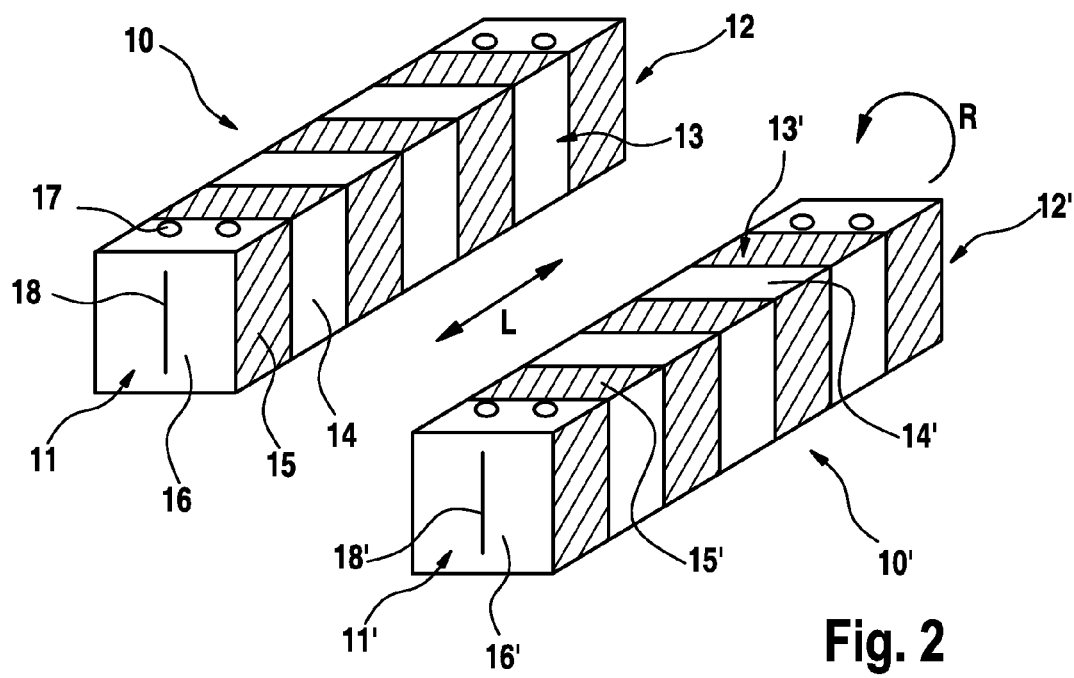
Figure 3:
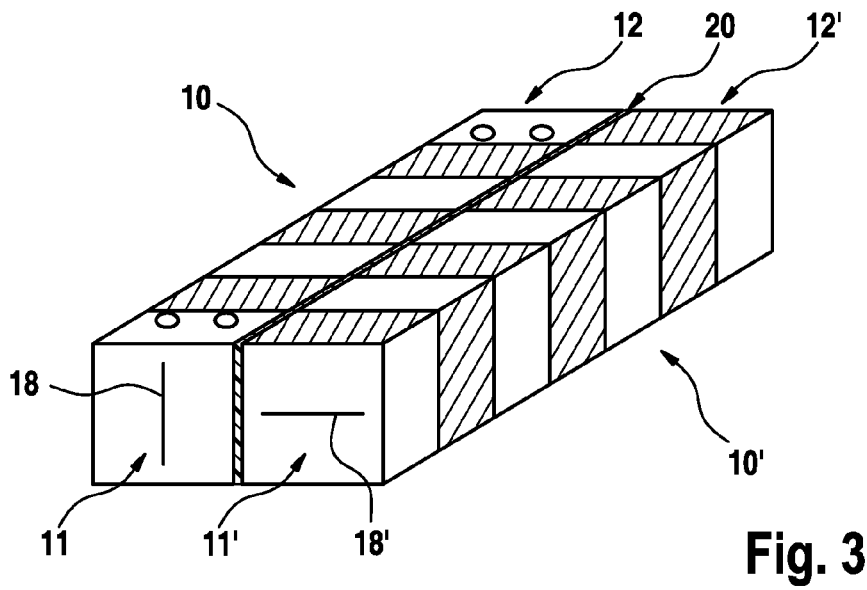
Figure 4:
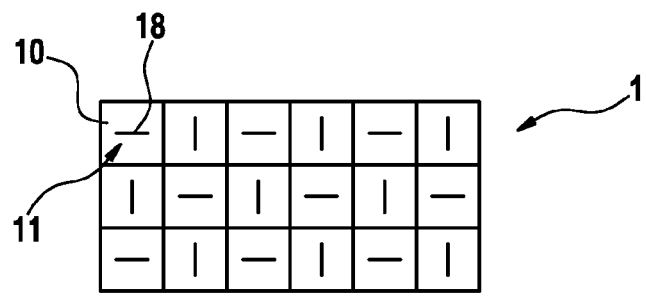
Figure 5:
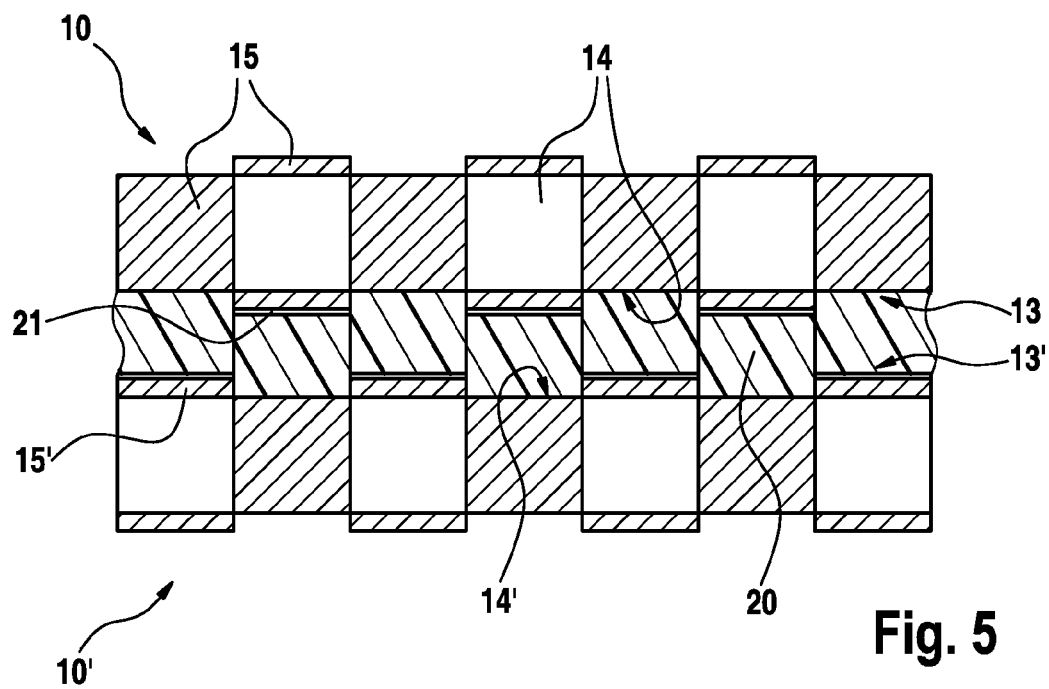
Figure 6:
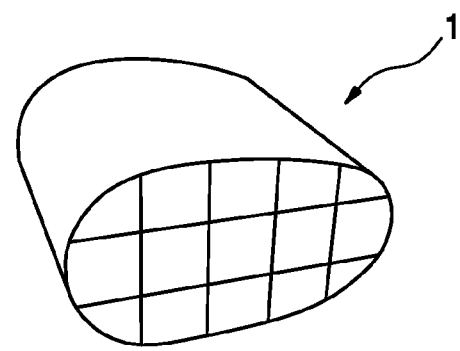
Figure 7:
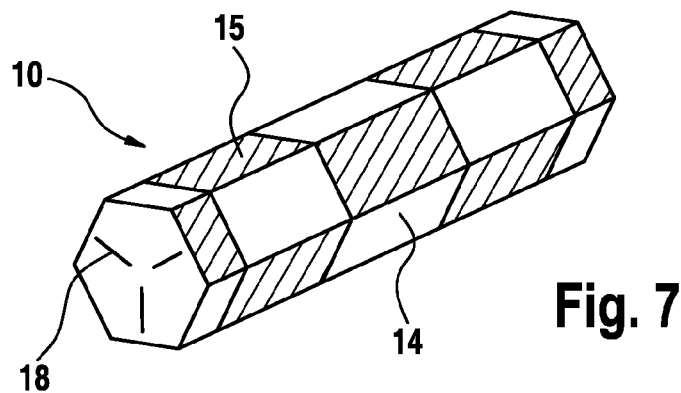
Figure 8:
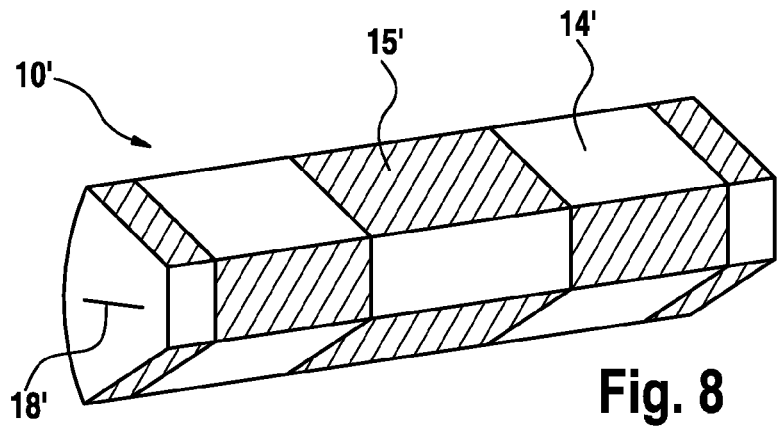
Figure 9:
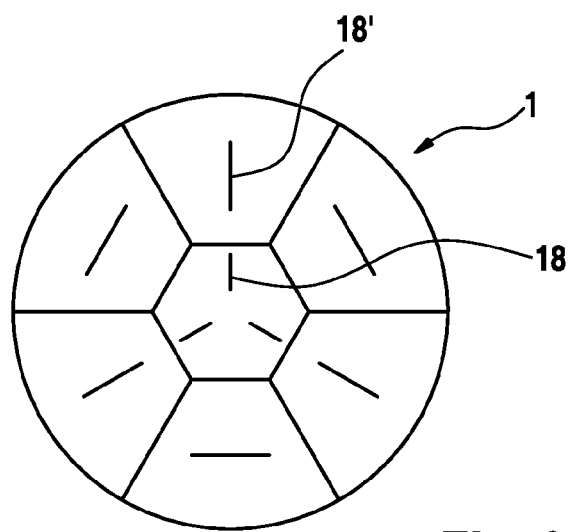

In the following, the invention is described with reference to exemplary embodiments that are explained in detail with reference to the drawings. They depict:

FIG. 1 a wall filter, as is known from the prior art;

FIG. 2 two filter elements according to the invention;

FIG. 3 the filter elements according to FIG. 2, wherein these are adhered;

FIG. 4 a plurality of filter element adhered together, wherein the end surfaces are depicted;

FIG. 5 a schematic representation of two opposing filter elements;

FIG. 6 a diesel particle filter in its final contour;

FIG. 7 a polygonal filter element;

FIG. 8 another polygonal filter element;

FIG. 9 a diesel particle filter in front view.

In the following description, the same reference characters are used for identical and identically functioning parts.

FIG. 1 depicts the principle of a particle filter 1 provided as a wall filter. Only a detail is depicted (only three flow channels 3), in order to demonstrate the flow of a fluid 4 through the filter. A particle filter 1 is customarily configured from a plurality of individual filter elements 10, which, in turn, have a plurality of flow channels 3 (same size or even different sizes, e.g., 12×12 channels per filter element). The intake channels are open on one end of the filter (intake side 11) and closed on the other end of the filter (exhaust side 12). Conversely, the exhaust channels are closed in the region of the intake side 11 and open in the region of the exhaust side 12. Thus, the medium 4 to be filtered is forced through the porous filter walls 2 of filter 1 such that the particles to be filtered out are retained on the walls 2.

FIG. 2 depicts two filter elements 10, 10' that are adhered together for production of the particle filter 1 just described. Depending on the desired size of the particle filter, a plurality of such filter element can be joined to each other.

The filter elements 10, 10' are rectangular and configured identically. However, any polygonal shape can be provided. Thus, each filter element has four side faces or longitudinal sides and two end surfaces 11, 12, 11' 12'. Since the filter elements are joined together, in particular adhered together, to produce the particle filter, all four longitudinal sides of a filter element can be provided as adhesion surfaces 13, 13'. FIG. 2 depicts only two filter elements; however, a plurality of filter elements can be provided for the production of a particle filter. If only two filter elements are to be adhered to each other, each filter element would need only one longitudinal side as an adhesion surface. The filter elements are made, for example, from silicon carbide (SiC).

The flow channels 3 (and, consequently, the direction of flow S) run in a longitudinal direction L of each filter element 10, 10' (as described above), with the end surfaces 11, 12, 11', 12' provided as the intake side or the exhaust side. Thus, the direction of flow S runs substantially parallel to the adhesion surfaces 13, 13'.

The end surfaces 11, 12, 11', 12' are, for production of the particle filter 1, covered in each case with a protective element 16, 16', e.g., a paper strip, (not visible on the back), such that the flow channels 3 are protected against contamination. The intake openings of the intake channels or the closed openings of the exhaust channels are arranged behind the protective elements 16, 16'. The opposite end surface has the exhaust openings or the closed openings of the intake channels.

The surface of the filter element 10, 10' or the at least one adhesion surface 13, 13' (here, in each case, two adhesion surfaces are shown) is coated. In this embodiment, the adjacent surfaces of each filter element are coated such that a checkerboard pattern is formed. The non-hatched or non-shaded (white) surfaces 14, 14' bear no coating; the silicon carbide is visible. The hatched or shaded lines represent an adhesive-repellent layer 15, 15', e.g., boron nitride. In other words, the hatched surfaces indicate that, here, an adhesive-repellent layer is applied (the hatch marks are not intended to represent a section).

Thus, each filter element 10, 10' has regions 15, 15' with layers made of adhesive-repellent material, with uncoated areas 14, 14' (SiC visible) formed complementary thereto (in this case, checkerboard pattern). The checkerboard pattern can, in each case, be repeated multiple times even on one adhesion surface.

In order to now adhere the at least two filter elements 10, 10', they are arranged relative to each other such that, in each case, the regions 15 with the adhesive-repellent layer of the one adhesion surface 13 (of the one filter element 10) opposite the uncoated regions 14' of the other adhesion surface 13' (of the other filter element 10') and reversed. "Reversed" means that the uncoated regions 14 of the adhesion surface 13 (of the one filter element 10) lie opposite the regions 15' with the adhesive-repellent layer of the other adhesion surface 13' (of the other filter element 10'). With an adhesive layer 20 that is introduced between the opposing adhesion surfaces 13, 13', gaps 21 arranged offset relative to each other (in this case, because of the checkerboard pattern) (see FIG. 5) are formed between the filter elements 10, 10'. These gaps or intentionally introduced "breaks" in the adhesive joint serve to increase the elasticity of the particle filter 1. However, since the adhesive layer 20, in this case, e.g., a cement layer, extends over the entire opposing adhesion surfaces 13, 13' of the two filter elements 10, 10' and the adhesive layer has a certain, preferably defined thickness, adhesion of the filter elements 10, 10' is nevertheless guaranteed (so-called adhesive bridges develop that enable adhesion).

As already described above, the end surfaces 11, 12, 11', 12' of the individual filter elements 10, 10' are in each case covered by a protective element 16, 16' in order to protect the flow channels 3 against contaminants, in particular, against the penetration of adhesive or adhesive-repellent substance. These protective elements 16, 16' are, for example, paper strips that can be readily removed after production of the particle filter. So that the filter elements 10, 10' are now adhered correctly to each other (adhesive-repellent layer to the opposing uncoated region), the filter elements must be or become appropriately oriented with each other.

Orientation and correct adhesion are made more difficult by the fact that the coated filter elements 10, 10' all look alike. Consequently, provision is made according to the invention to mark the elements and to adhere them to each other using the identification means 18, 18' (in appropriate alignment). As depicted with FIG. 1, a line marking 18, 18' is applied on the protective element 16, 16' of the end surfaces 11, 11'. This is, for example, a line or bar applied with color that indicates the orientation of the pattern of the coating of the adhesive-repellent layers 15, 15' or provides a reference as to how, in particular, the region or regions with the layer made of adhesive-repellent material is/are arranged.

In order to adhere the individual filter elements 10, 10' to each other with the desired orientation, the one filter element 10' must be rotated according to the direction of rotation R depicted in FIG. 2 by the arrow (in this case, for example, by 90°), such that the corresponding regions of the adhesion surfaces lie opposite each other.

FIG. 3 depicts the adhered filter elements 10, 10'. The filter elements are thus adhered together corresponding to the coating and the corresponding to the orientation or alignment of the identification means 18, 18' (that indicate the orientation of the coating). If more, i.e., a plurality of filter elements are adhered to each other, the bars on the end surfaces would be arranged or oriented alternatingly at right angles to each other (if the particle filter were placed on a horizontal plane, the markings would be arranged alternatingly vertical and horizontal relative to each other).

In FIG. 2, 2×2 spacer elements 17 are arranged in each case on the ends of an adhesion surface. The spacer elements are applied at least on one of the surfaces 13' to be adhered to each other. The spacer elements 17 guarantee a sufficient adhesive thickness, in this case, i.e., cement thickness, such that there is sufficient adhesion between the filter elements (the adhesive layer holds together despite the offset gaps because of its continuity).

As seen in FIG. 3, two filter elements 10, 10' are now adhered together; the identification means 18, 18' are arranged at right angles relative to each other. This indicates that the correct regions have been adhered together. Since the coating (adhesive-repellent layer) 15, 15' is also applied on other surfaces of the elements, other filter elements can also be joined here. Only in the case of end elements, which form the external surfaces of the finished filter, are not all surfaces of a filter provided as adhesion surfaces.

FIG. 4 depicts a plurality of filter elements 10 adhered together, with the end surfaces 11 depicted (the protective elements with the markings 18 have not yet been removed). In this case, 3×6 filter elements are adhered and the drawn or painted lines 18 (identification means) are in each case offset by 90° relative to each other. A blank 1' is depicted in the front view that has not yet been brought into its final form (drying, trimming, grinding).

FIG. 5 shows schematically and in exaggerated depiction two opposing filter elements 10, 10', onto which layers 15, 15' made of adhesive-repellent material are applied in regions. The adhesive-repellent layers are appropriately coated on both elements 10, 10' on all visible regions. The adhesive layer 20 is (for the sake of clarity) applied only on the two opposing adhesion surfaces 13, 13' of the two filter elements 10, 10', in order to illustrate the joining principle. The uncoated regions 14 of the one filter element 10 lie opposite the coated regions 15' of the other filter element 10'. The adhesive 20 located between them is not, or is only slightly, deposited on the coated regions 15, 15'. Thus, defined gaps 21 or regions with little or no adhesion are formed alternatingly between the filter elements, since the adhesive-repellent layer of the one element prevents complete adhesion with the opposing element. The gaps 21 are deliberately exaggerated for the sake of explanation. The adhesion is nevertheless guaranteed because the adhesive layer 20 is completely continuous and the gap 21 develops alternatingly on the one element 10 and the other element 10'. The adhesive 20 is also depicted with hatch marks, but with alternating heavy and light lines.

Because of the identification 18, 18' according to the invention, the opposing or the filter elements 10, 10' to be adhered are oriented in correct alignment. If the filter element 10' at the bottom in the image had been, for example, rotated by 90°), the regions with adhesive-repellent material, i.e., boron nitride regions, as well as uncoated regions would lie opposite each other. This would have resulted in non-offset gap formation which would seriously impair the stability of the finished particle filter. The corrected adhesion is enabled by the identification means.

FIG. 6 depicts a finished diesel particle filter 1 in final form; the end surfaces and, consequently, the flow channels are exposed. With the methods according to the invention and the filter elements according to the invention, individual filter elements can be adhered with certainty and simplicity to form a filter such that the gaps arranged offset to increase the elasticity of the particle filter are formed in a defined shape. The identification means applied on the end surfaces of a filter element enable the defined alignment of filter elements and incorrect adhesion is avoided.

FIG. 7 depicts a polygonal filter element 10, which already has a coating with adhesive-repellent layer 15. The clear or unhatched surfaces 14 are uncoated.

FIG. 8 depicts another polygonal filter element 10'. Here, as well, already coated regions 15' are provided. The surfaces 14' are uncoated.

The benzene ring-shaped element can serve, for example, as a center element onto which a plurality of the filter elements depicted in FIG. 8 are adhered. In a front view, the finished diesel particle filter 1 would then look like that depicted in FIG. 9. The identification marks 18 or 18' (see also FIGS. 7 and 8) reflect the coating pattern. The polygonal element according to FIG. 7 has a plurality of identification marks in order to adhere the polygonal elements according to FIG. 8 correctly with the center element. In this case, further processing of the filter by trimming and/or grinding would no longer be necessary.

LIST OF REFERENCE CHARACTERS

1 Particle filter
1' Particle filter-blank
2 Wall, filter wall
3 Flow channel
4 Fluid, medium to be filtered
10, 10' Filter element
11, 11' Intake side, end surface
12, 12' Exhaust side, end surface
13, 13' Adhesion surface
14, 14' Uncoated region
15, 15' Region with adhesive-repellent layer
16, 16' Protective element
17 Spacer element
18, 18' Identification means
20 Adhesive layer
21 Gap
L Longitudinal direction
R Direction of rotation
S Direction of flow

The invention claimed is:

1. A filter element, comprising:
at least one adhesion surface for adhesion to at least-one other filter element by way of an adhesive layer for production of a particle filter, the at least one adhesion surface comprising at least one coated region, coated with a layer made of adhesive-resistant material, and at least one uncoated region configured complementary to the coated region,
end surfaces, which are configured as an intake side and an exhaust side, wherein the filter element can be flowed through by a fluid through the intake side and the exhaust side,
protective elements, which are reversibly applied on the intake side and the exhaust side of the filter element to cover the end surfaces, and
identification means applied on one or more of the protective elements, such that the identification means reflects an orientation of the at least one coated region, such that the filter element can be adhered to the at least one other filter element to produce the particle filter according to the identification means.

2. The filter element according to claim 1, wherein
the adhesion surface is configured to accommodate the adhesive layer.

3. The filter element according to claim 1, wherein a direction of flow of the filter element runs substantially parallel to the adhesion surface.

4. The filter element according to claim 1, further comprising
at least two spacer elements are provided that are applied on the at least one adhesion surface of the filter element.

5. The filter element according to claim 4, wherein the at least two spacer elements are provided on both ends of the filter element.

6. The filter element according to claim 5, wherein two of said at least two spacer elements are provided on each of said ends.

7. The filter element according to claim 1, wherein
the coated region is a patterned region, in particular a checkerboard pattern.

8. The filter element according to claim 1, wherein
the identification means is provided as a line or bar having an orientation.

9. The filter element according to claim 8, wherein the line or bar is a color line or bar running parallel to two edges of a respective protective element.

10. A particle filter comprising at least two filter elements according to claim 1,
wherein the at least two filter elements are joined to form a particle filter-blank according to the identification means such that the at least one coated region of one filter element lies opposite and reversed with respect to the at least one uncoated region of another filter element.

11. The particle filter according to claim 10, further comprising:
an adhesive layer between the adhesion surfaces of the at least two filter elements to adhere the two filter elements, and
a gap between the adhesive layer and the coated region.

12. A method comprising:
using the filter element according to claim 1 for the production of the particle filter, in particular of a diesel particle filter.

13. A method for marking a filter element, comprising:
providing at least one surface of the filter element as an adhesion surface for adhesion to at least one other filter element by way of an adhesive layer for production of a particle filter,
wherein the filter element can be flowed through by a fluid through end surfaces configured as an intake side and an exhaust side,
verifying alignment of the filter element by way of an image-recognition-system through recognition of the intake side and the exhaust side,
arranging of the filter element such that the filter element can be brought into contact with the at least one other filter element,
applying protective elements to the intake side and the exhaust side of the filter element to cover the end surfaces,
applying a layer made of adhesive-repellent material to at least one region of the at least one adhesion surface of the filter element such that at least one uncoated region configured complementary thereto is provided, and
applying an identification means on at least one of the protective elements such that the identification means reflects an orientation of the at least one region with the layer made of adhesive-repellent material, such that the filter element can be adhered to the other filter element to produce the particle filter according to the identification means.

14. The method according to claim 13, further comprising:
applying at least two spacer elements on the at least one adhesion surface of the filter element or each filter element.

15. The method according to claim 13, wherein the layer made of adhesive-repellent material is applied as a pattern, in particular a checkerboard pattern.

16. The method according to claim 13, further comprising:
applying the identification means as a line or bar having an orientation.

17. The method of claim 16, wherein the line or bar is a colored line or bar running parallel to two edges of a respective end surface.

18. The method according to claim 13, further comprising:
applying the identification means on the protective element manually or mechanically, wherein a robot arrangement or similar automation system is provided for the mechanical application.

19. A method for producing a particle filter comprising at least two filter elements, the method comprising:
providing at least one surface of each filter element as an adhesion surface for bonding with the other filter element by way of an adhesive layer, wherein each filter element can be flowed through by a fluid through end surfaces configured as an intake side and an exhaust side,
verifying alignment of the filter element by means way of an image recognition system through recognition of the intake side and the exhaust side,
arranging the filter elements such that the filter elements have same orientation relative to the intake side and the exhaust side, and thus the at least two filter elements can be brought into contact with each other,
applying protective elements to the intake side and the exhaust side of each filter element to cover the end surfaces,
applying a layer made of adhesive-repellent material to at least one region of the at least one adhesion surface of each filter element such that at least one uncoated region configured complementary thereto is provided,
applying an identification means on the protective element of the intake side of each filter element and/or of the exhaust side of each filter element such that the identification means reflects an orientation of the at least one region with the layer made of adhesive-repellent material,
joining together the at least two filter elements into a particle filter blank according to the identification means such that the at least one region with the layer made of adhesive-repellent material lies opposite and reversed with respect to the at least one uncoated region,
applying an adhesive layer between the adhesion surfaces of the at least two filter elements,
adhering the at least two filter elements such that a gap is configured in each case between the adhesive layer and the regions with the layer made of adhesive-repellent material,
drying the particle filter-blank,
controlling the particle filter for corrected adhesion, and
removing the protective elements on the end surfaces of each filter element.

* * * * *

UNITED STATES PATENT AND TRADEMARK OFFICE
CERTIFICATE OF CORRECTION

PATENT NO. : 8,343,249 B2  
APPLICATION NO. : 13/381499  
DATED : January 1, 2013  
INVENTOR(S) : Michael Faber et al.

Page 1 of 1

It is certified that error appears in the above-identified patent and that said Letters Patent is hereby corrected as shown below:

On the title page item (75) (Inventors), please delete "Eckhardt" and replace it with "Eckardt."

In the body of the text, column 10, line 54 (claim 4), please delete "are provided that are."

In the body of the text, column 12, line 19 (claim 19), please delete "means."

Signed and Sealed this  
Fifth Day of March, 2013

Teresa Stanek Rea  
*Acting Director of the United States Patent and Trademark Office*